(12) United States Patent
Dolan et al.

(10) Patent No.: US 12,460,632 B2
(45) Date of Patent: Nov. 4, 2025

(54) RECIPROCATING PUMP PACKING LUBRICATOR

(71) Applicant: Bill Spitzer & Associates, Houston, TX (US)

(72) Inventors: Robert R Dolan, Kingwood, TX (US); Steven Logan, Fulshear, TX (US); Connor Spitzer, Houston, TX (US)

(73) Assignee: Bill Spitzer & Associates, Houston, TX (US)

( * ) Notice: Subject to any disclaimer, the term of this patent is extended or adjusted under 35 U.S.C. 154(b) by 0 days.

(21) Appl. No.: 18/656,598

(22) Filed: May 7, 2024

(65) Prior Publication Data

US 2024/0287983 A1    Aug. 29, 2024

Related U.S. Application Data

(63) Continuation of application No. 17/660,624, filed on Apr. 25, 2022, now Pat. No. 11,976,651, which is a
(Continued)

(51) Int. Cl.
*F04B 53/18* (2006.01)
*E21B 43/26* (2006.01)
(Continued)

(52) U.S. Cl.
CPC .............. *F04B 53/18* (2013.01); *E21B 43/26* (2013.01); *F04B 23/025* (2013.01); *F04B 23/06* (2013.01); *F04B 53/02* (2013.01); *F04B 53/20* (2013.01)

(58) Field of Classification Search
CPC ......... F04B 53/18; F04B 23/025; F04B 53/02
See application file for complete search history.

(56) References Cited

U.S. PATENT DOCUMENTS

| | | | | |
|---|---|---|---|---|
| 1,768,139 A | * | 6/1930 | Nugent | B01D 17/0208 |
| | | | | 184/6.24 |
| 2,164,273 A | * | 6/1939 | Hodson | F16N 11/10 |
| | | | | 184/29 |

(Continued)

FOREIGN PATENT DOCUMENTS

| | | | | |
|---|---|---|---|---|
| DE | 102018126114 A1 | * | 4/2020 | .............. F04B 17/03 |
| EP | 3056790 A1 | * | 8/2016 | .............. F16N 7/40 |
| EP | 3056790 B1 | | 4/2019 | |

OTHER PUBLICATIONS

"Electric pump EP-1." BEKA-MAX, https://www.groeneveld-beka.com/files/2916/2608/1209/Description_EP-1_wirh_bayonett_connector_1112EN.pdf; accessed Jul. 26, 2022.

(Continued)

*Primary Examiner* — Michael A Riegelman
(74) *Attorney, Agent, or Firm* — Michael Scheinberg; Scheinberg & Associates, PC

(57) ABSTRACT

A lubricator package for intermittently delivering a lubricant to lubrication points on packing on a high-pressure reciprocating pump, a frac pump is described. A preferred package includes a large (e.g., 10 gallon) capacity reservoir; a three or five outlet pump; a common manifold receiving oil from the large capacity reservoir and supplying oil or grease to the pumps; a mounting stand supporting the large capacity reservoir and the five outlet pump; and an optional a control package providing low level monitoring of lubricant flow and controlling the pump providing a pump stroke counter or timer.

15 Claims, 8 Drawing Sheets

Related U.S. Application Data continuation of application No. 17/522,848, filed on Nov. 9, 2021, now abandoned.

(60) Provisional application No. 63/112,115, filed on Nov. 10, 2020.

(51) Int. Cl.
   *F04B 23/02* (2006.01)
   *F04B 23/06* (2006.01)
   *F04B 53/02* (2006.01)
   *F04B 53/20* (2006.01)

(56) References Cited

U.S. PATENT DOCUMENTS

| | | | | |
|---|---|---|---|---|
| 4,186,654 | A * | 2/1980 | Scott | F16N 7/40 |
| | | | | 184/18 |
| 5,125,480 | A * | 6/1992 | Gregory | F16N 29/00 |
| | | | | 184/6.26 |
| 5,285,871 | A * | 2/1994 | Sievenpiper | F16N 11/10 |
| | | | | 184/29 |
| 5,318,152 | A * | 6/1994 | Ehlert | F16N 39/002 |
| | | | | 184/104.1 |
| 5,733,048 | A * | 3/1998 | El-Ibiary | F16N 7/40 |
| | | | | 384/399 |
| 6,145,626 | A * | 11/2000 | Niemczura, Sr | F16N 29/00 |
| | | | | 184/55.1 |
| 9,227,225 | B2 * | 1/2016 | Evarts | F16H 57/0415 |
| 10,753,535 | B2 * | 8/2020 | McKim | F16N 13/22 |
| 11,359,765 | B2 * | 6/2022 | Gouge | F16N 7/385 |
| 11,976,651 | B2 * | 5/2024 | Dolan | F04B 53/02 |
| 12,286,330 | B2 * | 4/2025 | Martins | B66B 7/1223 |
| 2012/0145484 | A1 * | 6/2012 | Fassbinder | F16N 37/003 |
| | | | | 184/26 |
| 2015/0345272 | A1 * | 12/2015 | Kajaria | E21B 47/00 |
| | | | | 166/308.1 |
| 2016/0208786 | A1 * | 7/2016 | Aiken | F04B 53/18 |
| 2017/0114957 | A1 * | 4/2017 | Conley | F16N 29/02 |
| 2017/0146189 | A1 * | 5/2017 | Herman | F16N 21/00 |
| 2019/0195424 | A1 * | 6/2019 | Edler | F16K 11/044 |
| 2020/0116302 | A1 * | 4/2020 | Glass | F16N 11/00 |
| 2022/0325711 | A1 * | 10/2022 | Dolan | F04B 23/025 |
| 2022/0412333 | A1 * | 12/2022 | Kornfeld | F04B 39/0292 |
| 2024/0287983 | A1 * | 8/2024 | Dolan | F04B 23/025 |

OTHER PUBLICATIONS

"Original operating and assembly manual for grease lubrication pumps," BEKAMAX, https://www.groeneveld-beka.com/files/4415/9594/5870/BAL_2152_EP1_Central_grease_lubrication_pump_0816_EN.pdf; accessed Jul. 26, 2022.

* cited by examiner

RECIPROCATING PUMP PACKING LUBRICATOR

TECHNICAL FIELD OF THE INVENTION

The present invention relates to lubrication systems and, in particular, to packaged lubrication systems that deliver lubricant to pump packings for high pressure reciprocating pumps used in hydraulic fracturing.

BACKGROUND OF THE INVENTION

Automatic pump-to-point lubrication systems are designed to intermittently deliver oil or grease to plunger packings on high-pressure reciprocating pumps, commonly referred to as frac pumps or pressure pumps, used in the hydraulic fracturing industry. The lubrication system typically includes a 24 VDC lubrication pump with three or five plungers, each plunger providing oil or grease to a separate outlet. The leading manufacturers are Gardner Denver, Weir, and Caterpillar, with pumps available with either 3 or 5 plungers or referred to as a Triplex or Quintaplex, respectively.

The interval at which lubrication is delivered to the plunger packings on the frac pump is typically determined either by a count of the strokes of the frac pump or by time intervals. When using stroke count, once a preprogrammed number of pump cycles has been met, a lube event would be initiated, that is, the lube pump turns on for a given period, usually seconds or possibly minutes.

In a timed-based systems, the lube pump is not operating during an "off" time, typically minutes or seconds. Once this "off" time elapses, a lube event is initiated, with the lube pump operating for seconds or minutes. A controller tracks the stroke count or the elapsed time and directs the initiation of a lubricant cycle. After the predetermined time, the controller stops the lubrication cycle.

Typically, manufacturers, such as SKF Lincoln, Graco, and Groeneveld-Beka will sell individual components of lubrication system and independent distributors or integrators, like Bill Spitzer and Associates, will "package" these commercially available lubrication system components into a functioning lubrication system.

Packaged systems typically suffer from several downsides. The reservoir capacities are insufficient, requiring frequent refilling and the reservoirs do not contain provide contamination-free lubricant to the pump. The reservoirs feed lubricant directly into the multiple outlet pump, which can result in uneven availability of lubricant to the multiple pumps inlets and cause cavitation. The individual sensors in the system are not pre-wired, requiring the user to wire the lubrication system.

SUMMARY

An object of the invention is to provide a packaged lubrication system for high pressure pumps used in hydraulic fracturing.

A packaged lubrication system for a frac pump simplifies the installation of a lubrication system by an end user. A packaged lubrication system includes a large capacity reservoir for storing lubricant, a pump assembly including a pump having multiple plunger elements, each plunger element providing oil at a corresponding outlet, and a manifold receiving lubricant from the large capacity reservoir and supplying the lubricant to the multiple plungers of the pump. A stand supports the large capacity reservoir, and the pump assembly is mounted to the stand. A first filter for removing contaminants from the lubricant prior to the lubricant entering the large capacity reservoir can be provided, along with a pressure gauge to indicate when the filter is becoming clogged. A second filter can be provided for filtering lubricant leaving the reservoir and entering the manifold. The pump outlets are each connected to a corresponding system outlet mounted on the stand and a flow sensor is connected to each of the system outlets for monitoring the flow and taking action if the flow is not within specifications. The lubrication system provides the advantage of an easy to follow installation process that minimizes cost and downtime of the equipment.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

This disclosure described automatic pump-to-point lubrication packages that are designed to intermittently deliver oil or grease to plunger packings on a high-pressure reciprocating pump, commonly referred to as frac pumps or pressure pumps used in the hydraulic fracturing industry.

Various embodiments of the invention may include one or more of the following features:

- Large capacity reservoir (about 10 gallons or more, for example, for a five outlet pump) with sight glass for oil level;
- The ability to filter the oil prior during refill and prior to entering the pump;
- Three or five outlet pumps with common manifold feature;

Installation mounting stand and pre-wiring of components, which makes for a seamless installation; and Controls package offers low level monitoring along with the following system operating controls, pump stroke counter or on/off timed option, along with flow monitoring utilizing either a flow meter or pressure transducer.

Packaged lubricant systems in accordance this disclosure provide the field technicians with a reliable, easy to install lubrication system for frac pumps.

Figure 1:
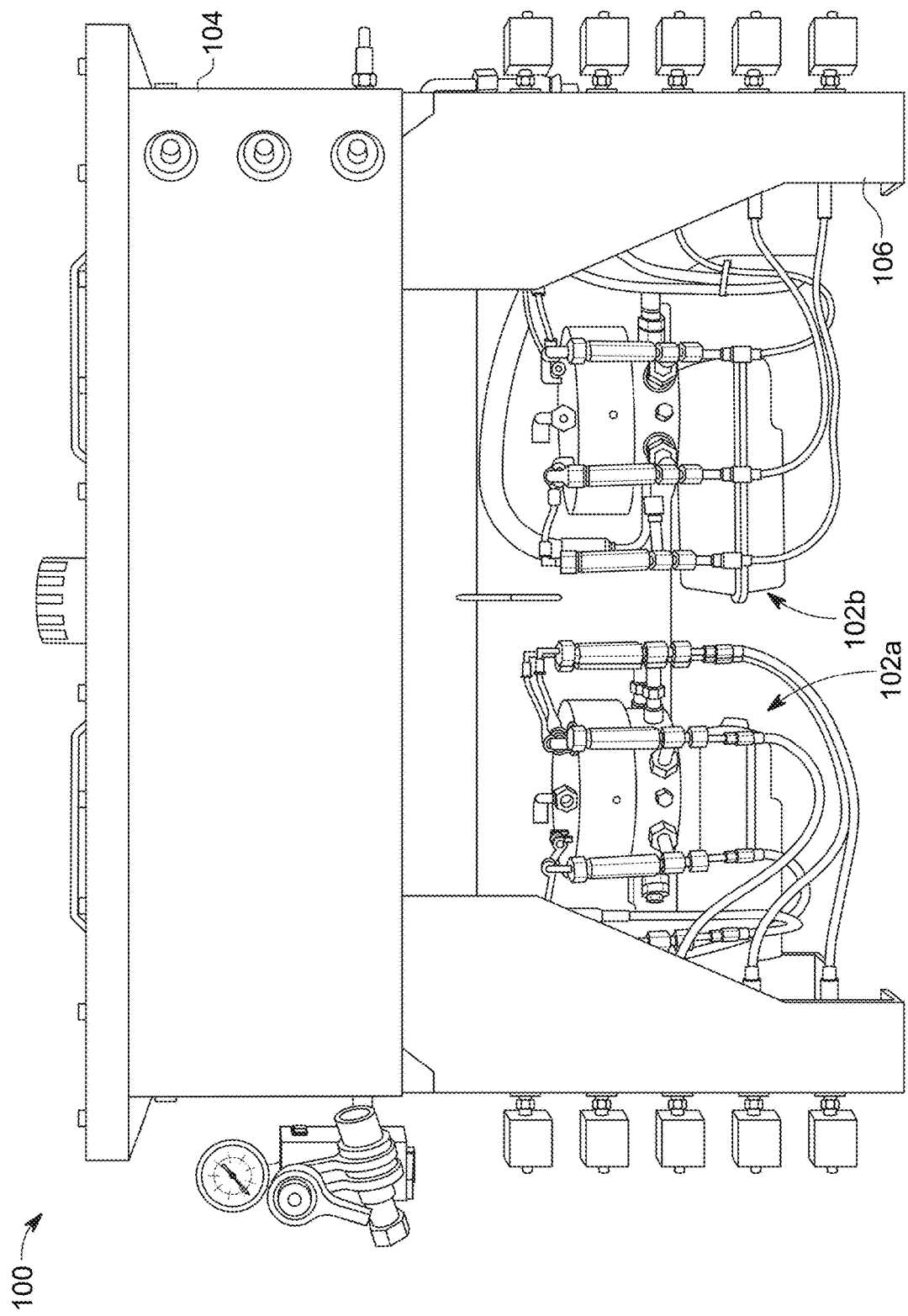
FIG. 1 shows a front view of a lubrication system using a 20 gallon reservoir and 2 five-outlet pump assemblies.

FIG. 1 is a front view of an embodiment of a ten outlet lubrication system 100 including two five-outlet lubricant pump assemblies 102a and 102b. A reservoir 104 provides lubricant to the lubricant pump assemblies 102a and 102b. A stand 106 supports the reservoir 104, and the pump assemblies 102 are mounted on the stand. In one embodiment, the reservoir is constructed from 5052 aluminum and holds about 20 gallons. There are two standpipe outlets (not shown) in reservoir 104, one standpipe outlet for each of the two lubricant pump assemblies 102a and 102b. Each standpipe outlet includes a filter, such as a 100 mesh suction strainer. Applicant has found that contamination is the leading cause of lubrication system malfunctions in the field. The reservoir preferably has a large capacity to reduce the number of times it needs to be refilled. By large capacity is meant greater than about 1 gallon per pump outlet, greater than about 1½ gallons per pump outlet, or greater than or equal to about 2 gallons per pump outlet. That is, for a 5 outlet pump, the reservoir capacity is greater than about 5 gallons, greater than about 7½ gallons, or greater than about 10 gallons.

Figure 2:
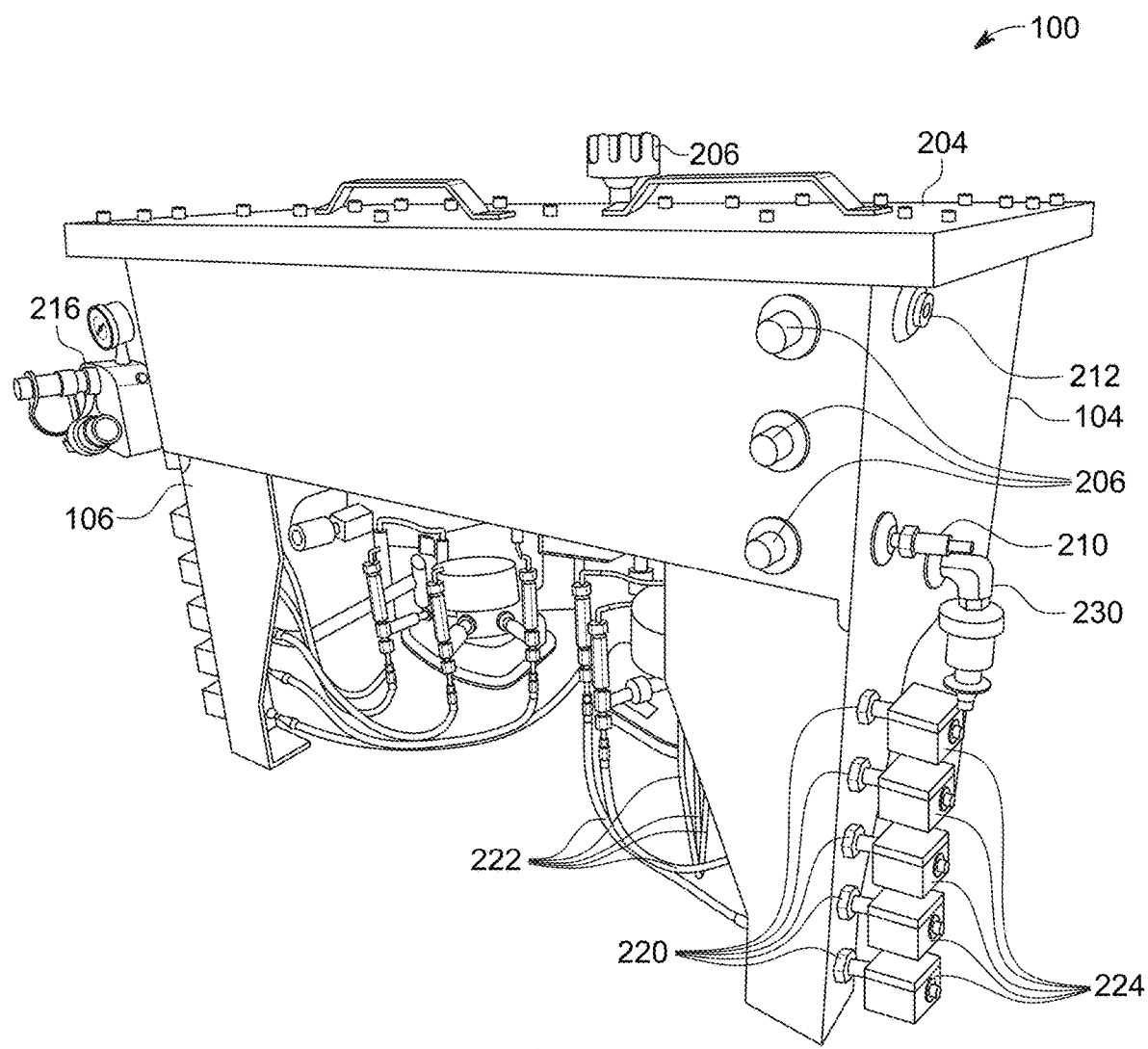
FIG. 2 shows an isometric view of a lubrication system of FIG. 1.

FIG. 2 shows an isometric view of the embodiment of the ten-outlet lubrication system 100 of FIG. 1. Reservoir 104 covered by a removeable lid 204 that can be removed to clean the reservoir. The removeable lid 204 includes a breather valve 206 that maintains atmospheric pressure within reservoir 104. Lubricant is gravity fed form reservoir 104 to pump assemblies 102a and 102b. The outlet port to feed the pump assemblies can be on the bottom of the reservoir or on the side of the reservoir, which facilitates conversion of existing tanks. If installed on the bottom of the tank, a ½ or ¾" coupling will be welded into the bottom of the tank. Existing 10-gallon tanks in the field can be converted by using the side, 1" port to supply the pump. The reservoir 104 includes three sight glasses 206 that allow an operator to view the level of lubricant in the reservoir 104. A reservoir lower level sensor 210 sends an electronic signal, and optionally a visible signal, when the lubricant level in reservoir 104 reaches the level of the sensor. A reservoir high level sensor port 212 allows insertion of a high level sensor (not shown) into reservoir 200 to facilitate automatic fill of the reservoir. A fill filter 216, such as a 25 micron cartridge filter, filters lubricant as it is being pumped into reservoir 104. As the filter becomes clogged, the pressure rise across the filter and the increased pressure is shown by a pressure meter. The increase in pressure signals the operator to change or clean the filter.

Figure 3:
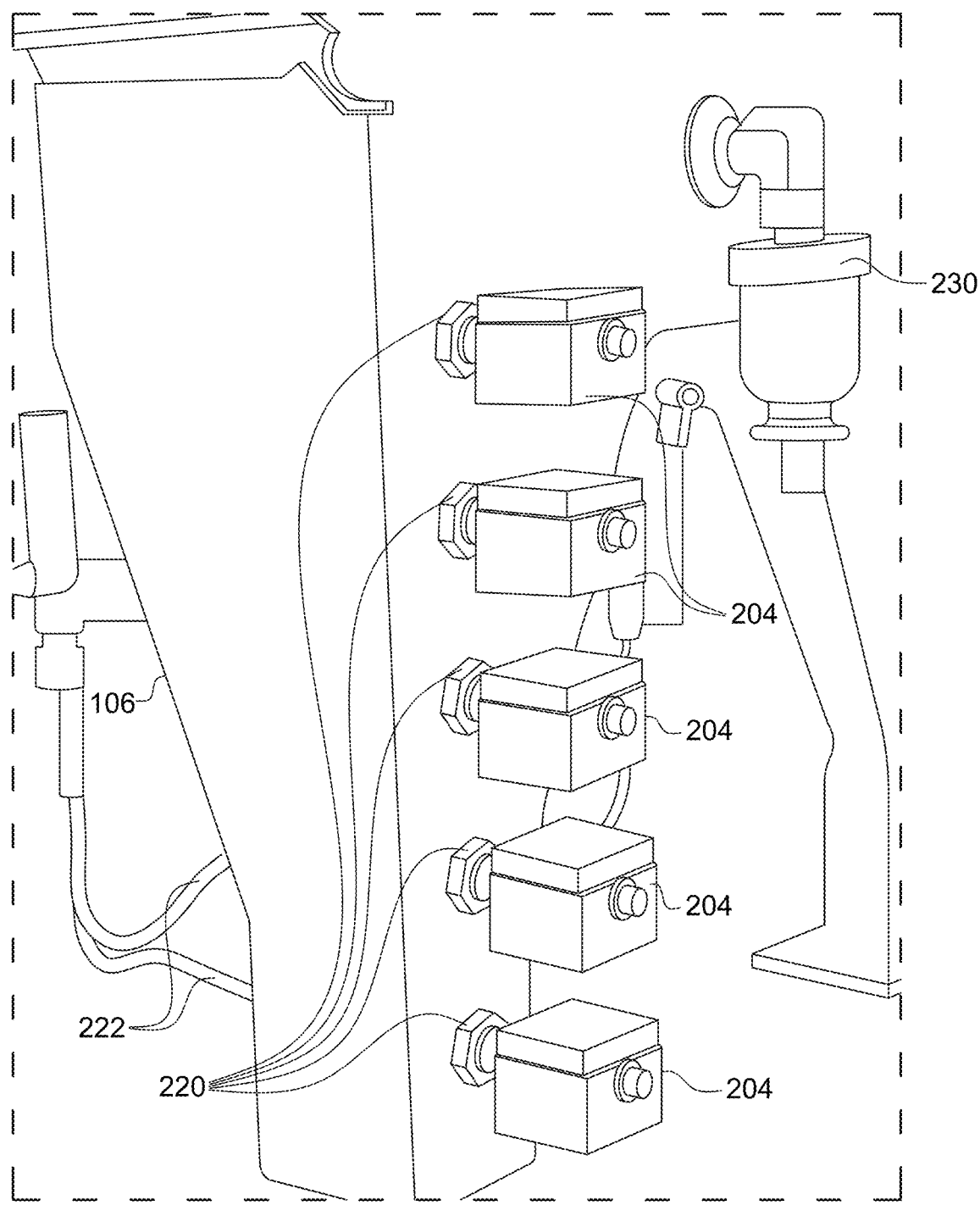
FIG. 3 shows a portion of the stand of the lubrication system of FIG. 1.

Five system outlets 220 (for a five outlet pump) are mounted on the stand 106 are each supplied with lubricant from a corresponding pump outlet through high pressure hydraulic hose or tubing 222 through a bulkhead fitting mounted on stand 106. Mounting the outlets 220 on stand 106 facilitates providing a lubricant system package that can be readily installed in the field, eliminating the need to connect directly to each pump outlet in the field. Each outlet includes a flow sensor 224. Flow sensor 224 can provides a visual or electronic signal indicating flow. For example, flow sensor 224 can be a geared flow meter that displays a light and sends signal for each cycle of a known flow amount. Alternatively, a pressure transducer, or other sensor, can be used confirm and measure flow. A visual low point drain valve 230 for reservoir 104 shows the presence of water or other contamination in the bottom of the tank and allows the user to drain water or other contaminants should it exist. FIG. 3 shows an enlarged view of a portion of the lubrication system 200 of FIG. 2. FIG. 3 shows five of the flow meters 224 and low point drain 230 of reservoir 104

Figure 4:
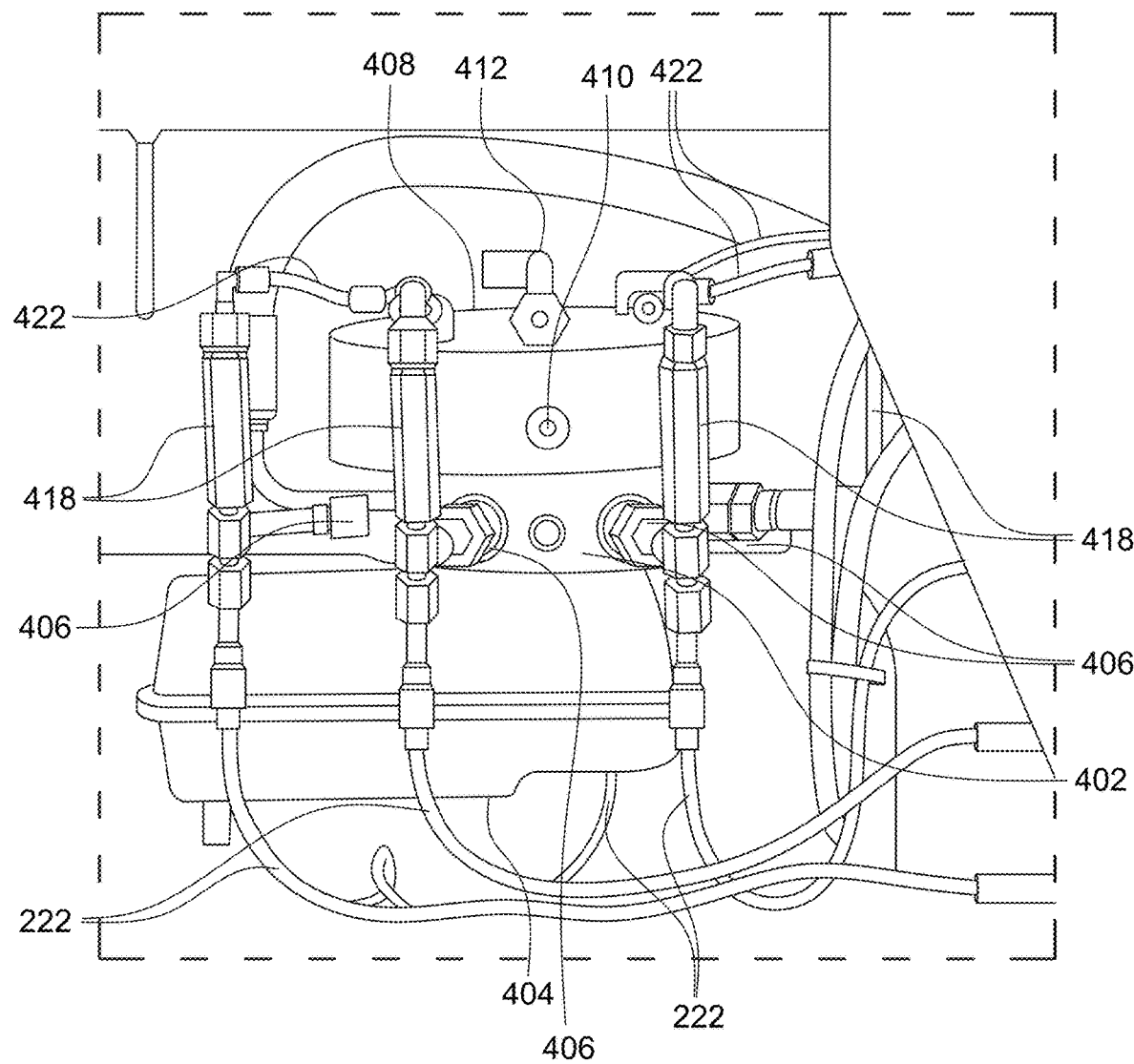
FIG. 4 shows one of the pump assemblies of the lubrication system of FIG. 1

FIG. 4 shows pump assembly 102b, showing pump 402 driven by a 24 VDC electric motor 404. Pump 402 has five outlets 406 (4 visible). Pump 402 is supplied with lubricant from a manifold 408. Each pump outlet typically supplies lubricant to a single lubricated point via a high pressure hydraulic hose. Manifold 408 typically sits atop the pump and serves as an intermediate common reservoir to supply lubricant to all three or five pump elements. The use of manifold 408 guards against pump element cavitation. In prior art systems, the pumps were fed from an integrated plastic reservoir. More than one manifold may be serviced from a single reservoir, with each manifold preferably having its own outlet from the reservoir with its own standpipe filter at its outlet. Internal baffles in the reservoir allow lubricant to flow to the various outlets while preventing sloshing during transport. Each of the pump sections associated with a plunger and a corresponding outlet has its own inlet from the manifold. That is, a five outlet pump would have five inlets from the manifold. The volume of lubricant in the manifold is much smaller than the volume of lubricant in the reservoir that supplies the manifold. For example, the volume of lubricant in the manifold shown in FIGS. 1-3 is approximately 2 liters. The volume of the manifold is preferably less than about 0.5, less than about 0.2, less than about 0.1, or less than or equal to about 0.05 times the volume of the reservoir. While the lubricant level in the reservoir will be decreasing as the system is operating and lubricant is pumped to the frac pump, the lubricant in the manifold is constantly refilled from the reservoir, maintaining sufficient lubricant in the manifold to avoid the pump operating without lubricant. The prevents cavitation and prevents the pump from losing its prime.

Pump 402 can be, for example, BEKA EP-1 pumps with five PE-170 pump elements. For grease service, such as grease define by the National Lubricating Grease Institute as Grade 1 or Grade 2, a weighted cylindrical follower plate can be used in the reservoir to assist in forcing grease into the manifold to maintain prime on the five outlet pump. The 3- or 5-outlet pump can be fed from the tank thru hose, tubing, possibly flange fittings to either the top of the manifold or fed to an alternative inlet side port on the pump.

Manifold 408 includes a sight glass 410 to observe the level of lubricant in the manifold 408 so that the operator can confirm that the manifold is being filled from reservoir 104. Manifold 408 also includes a purge valve 412 that allow air to be purged from manifold 408. Positioned at each outlet 406 of pump 402 is a pressure relieve valve 418. Lubricant exiting pump outlet 406 passes through tubing 222 towards at system lubricant outlet connection 220. If the lubricant path is blocked and the pressure at pressure relief valve 418 increases to over a pre-set value, typically about 2,000 psi, lubricant exiting the corresponding outlet of pump 402 is routed through pressure relief valve 418 and back to into the manifold through tubing 422.

Figure 5:
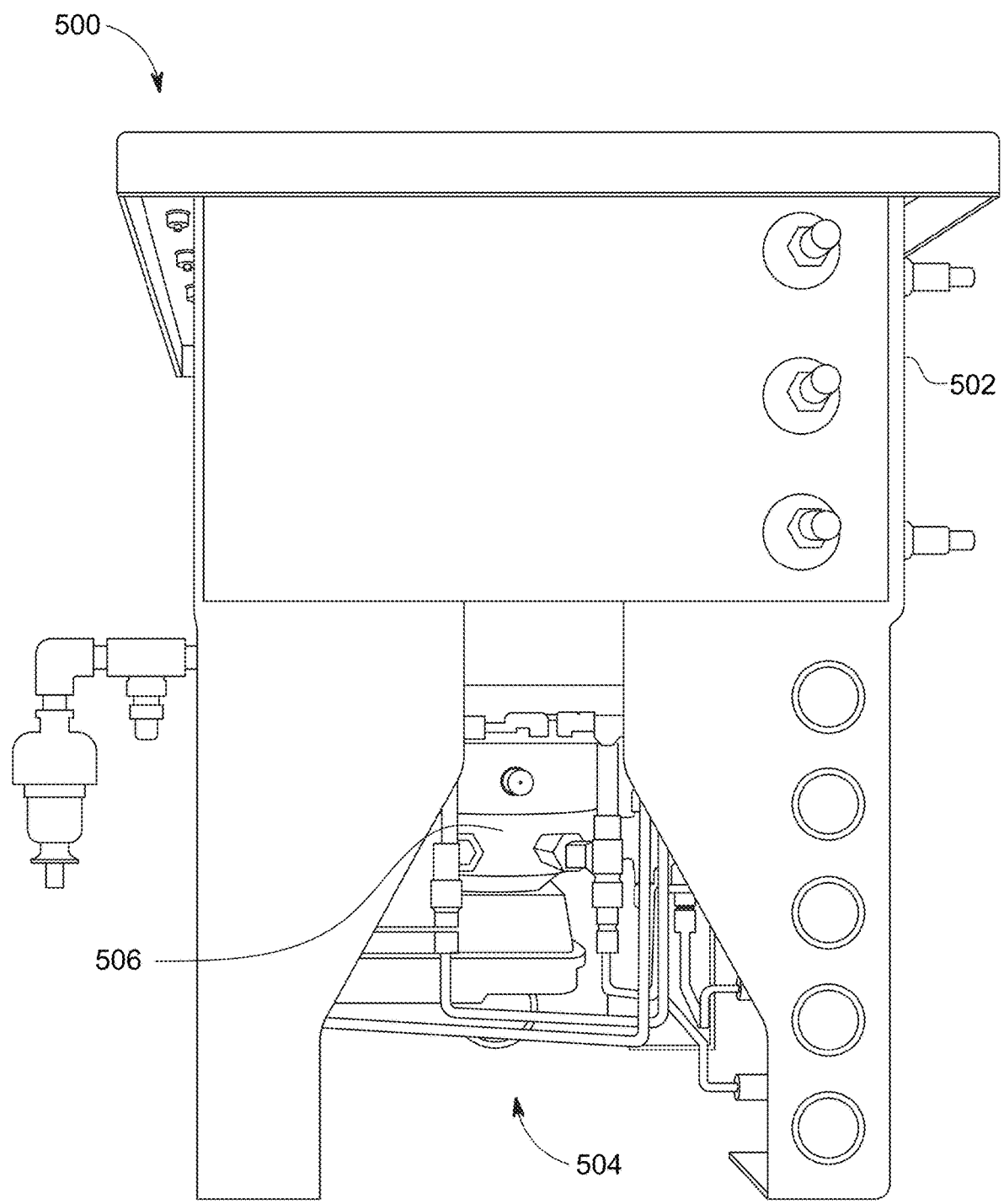
FIG. 5 shows a side view of a lubrication system that includes a 10 gallon reservoir and a single five-outlet pump assembly comprising a five outlet pump.

While the system described above includes a 20 gallon reservoir and two five outlet pump assemblies, the invention is not limited to such as system. For example, FIG. 5 shows a lubrication system 500 that includes a 10 gallon reservoir 502 and a single lubricant pump assembly 504 including a single five outlet pump 506. Other than including a smaller reservoir and a single lubricant pump assembly, lubrication system 500 includes similar components to those of lubricant system 100. Other embodiments can use different reservoirs and pumps, such as 3 plunger pumps.

Figure 6:
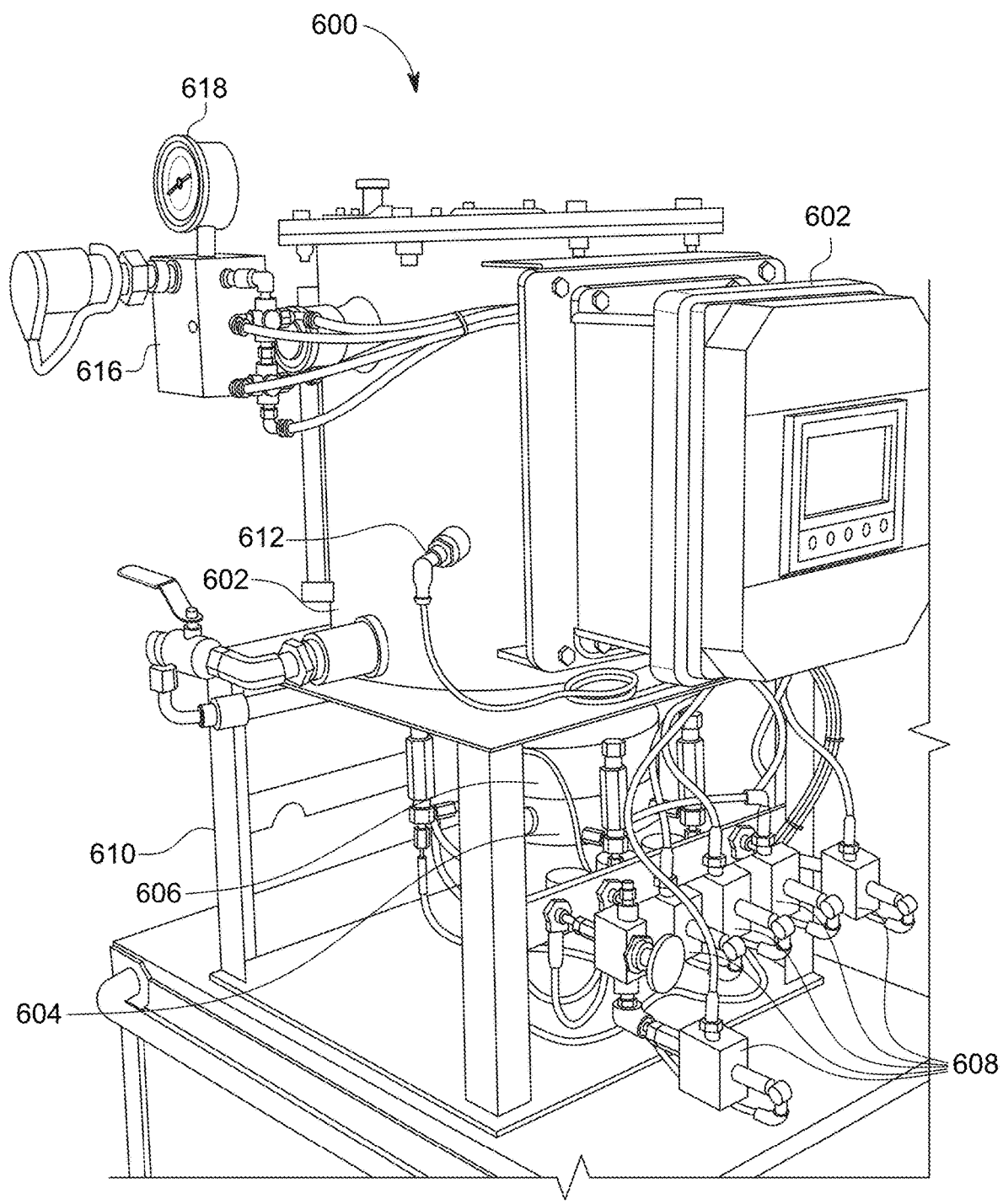
FIG. 6 shows an embodiment of a lubrication system including a controller.

FIG. 6 shows another embodiment of a lubrication system 600 that includes a controller 602. Lubrication system 600 includes many of the same parts as lubrication systems 100 and 500, including a reservoir 602, a lubricant pump 604, a manifold 606, flow sensors 608, a stand 610 and a reservoir low level switch 612. Flow sensors can be, for example, flow gauges that mechanically measure flow or pressure transducers that indicate pressure changes due to flow. Lubrication system 600 also includes a reservoir inlet filter 616 with pressure gauge 618 that will indicate increasing pressure as the filter gets plugged, indicating that a filter change is required.

Controller 602, or a controller used with lubrication system 100 or 500, receives stroke signals from the frac pump or measures a predetermined time interval to determine when to initiate a lubrication event by turning on 604. Controller 602 also receives sensor input from the flow sensors 608 to ensure that lubricant is being provided at the pump outlets and can provide an alarm or shut down the frac pump is lubricant is not flowing. Controller 602 can also receive input from all the sensors in the system and control all the components in the system. For example, controller 602 can receive a signal from low level system 612 and initiate an automatic refill of reservoir 602.

Figure 7:
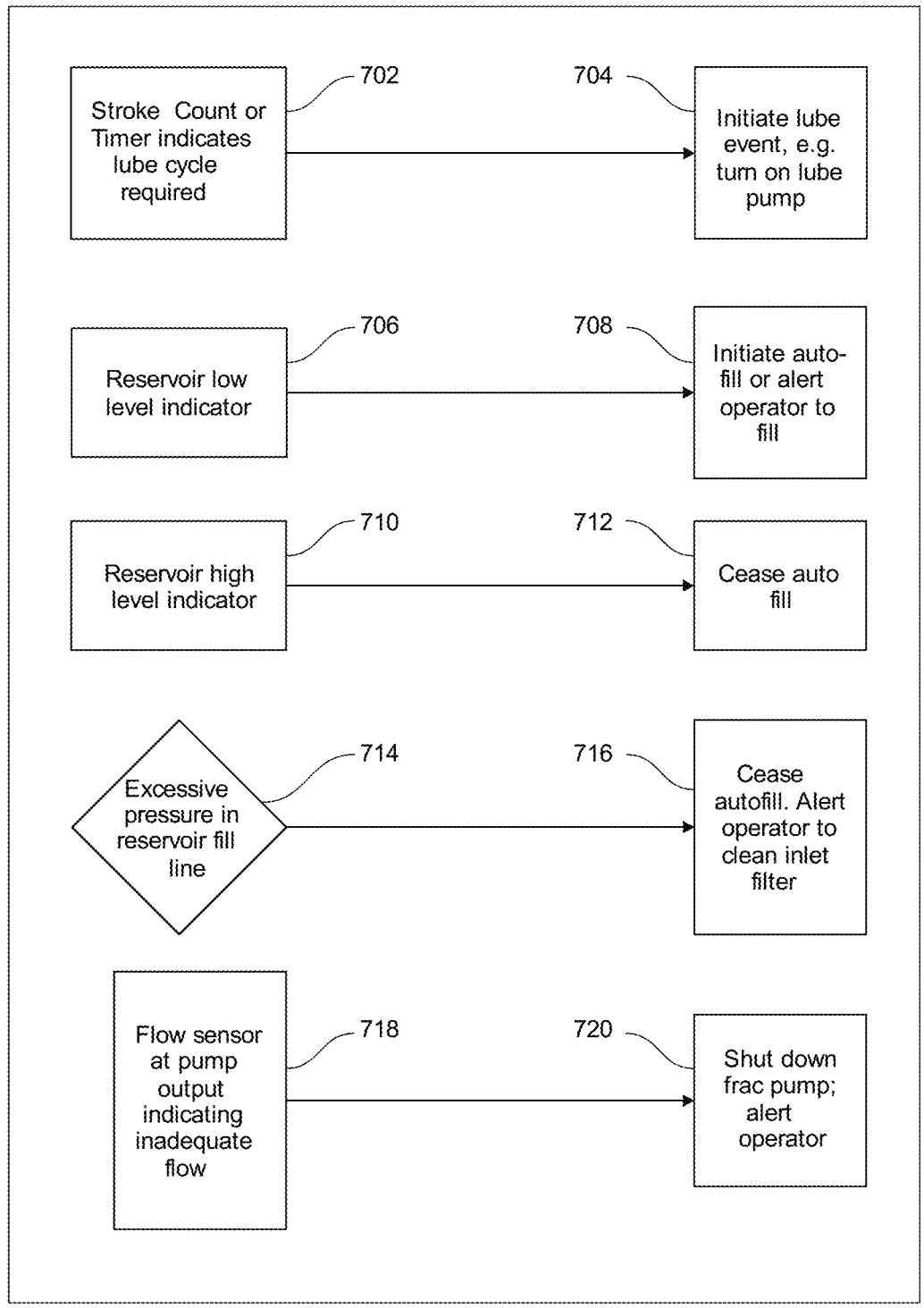
FIG. 7 shows examples of controlled response to input from various sensors of the lubrication system.

FIG. 7 shows the control logic 700 used by controller 602 in response to various inputs from sensors. When the stroke count or time indicates that a lube cycle is required in block 702, controller 602 initiates a lube event in block 704 by turning on the lube pump. When the reservoir low level sensor sends an indicator to the controller that the lube level in the reservoir is low in block 706, the controller 602 initiates an autofill event or signals an operator to manually add lubricant to the reservoir in block 708. When the optional reservoir high level sensor sends an indicator to the controller 602 that the lube level in the reservoir is high in block 710, the controller stops the autofill process and/or alerts the operator to stop filling the reservoir in block 716. When one of the flow sensors at any of the outlets of the multiple outlet pump indicates that the lube flow is inadequate in block 718, the controller instructs the frac pump to shut down to prevent damage and an operator is alerted in block 720.

Also included in this disclosure is a method of providing lubricant for a frac pump.

Figure 8:
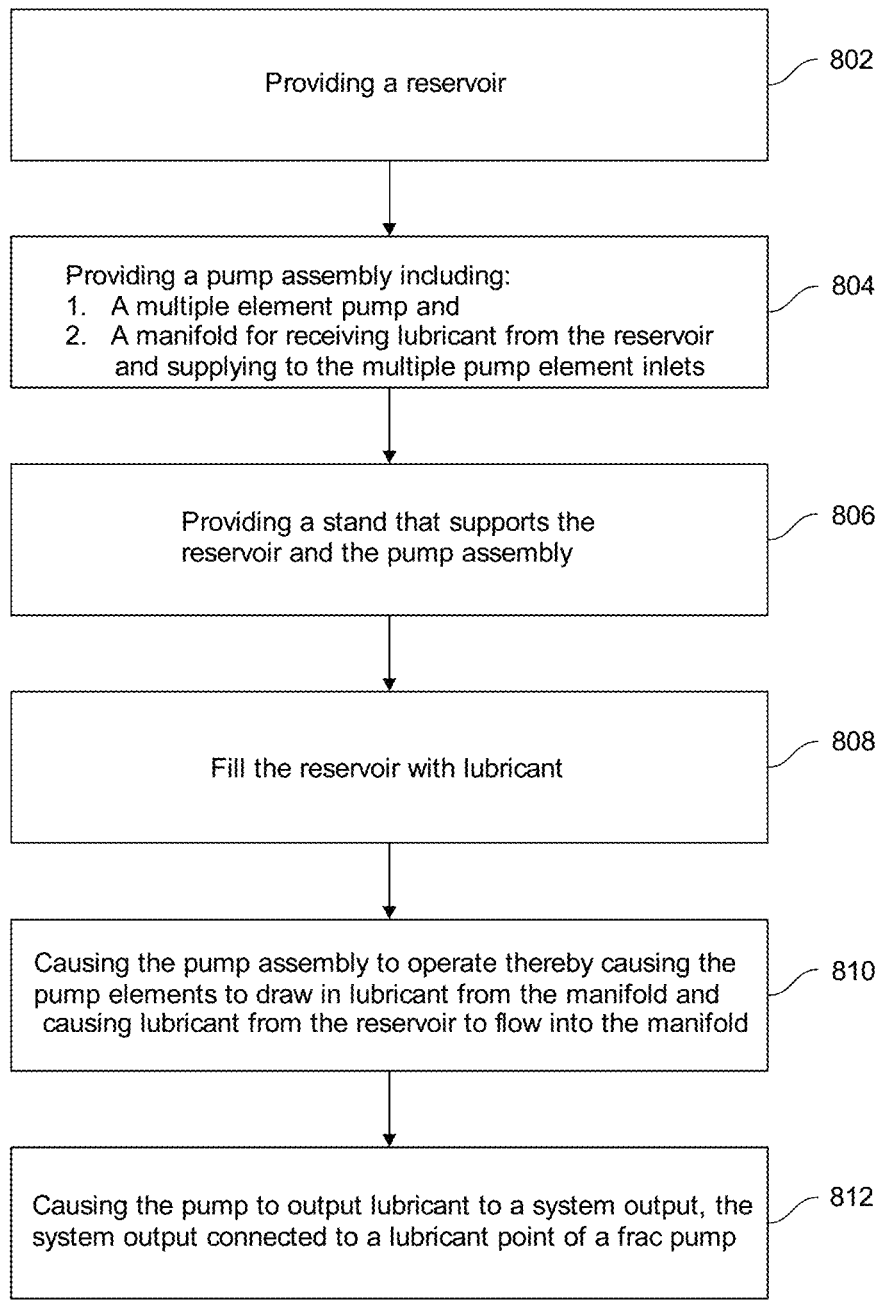
FIG. 8 shows a method of providing lubricant for a frac pump.

FIG. 8 shows a method of providing lubricant for a frac pump. In step 802, a reservoir is provided. In step 804, at least one pump assembly is provided, the pump assembly including a multiple element pump and a manifold for receiving lubricant from the reservoir and supplying the lubricant to the multiple pump element inlets, the manifold preferably having a volume of between 0.01 and 01 the volume of the reservoir. In step 806, a stand is provided. The reservoir, pump assembly and stand provide a packaged lubrication system.

In step 808, the reservoir is filled with lubricant. In step 810, the pump is operated by preferably a 24V electric motor controlled by an electronic controller. Once the pump is configured, when lubrication is needed the pump will turn on for a preset time interval and then turn off. The pump is under the control of the electronic controller. The need for lubricant is typically determined by a stroke count of the lubricated equipment or based on a time interval between lubricant events. When the pump turns on, lubricant from the manifold flows into the pump element inlet, and the lubricant in the manifold is replaced via gravity feed by lubricant from the reservoir.

In step 812, lubricant from the pump element flows to a system lubricant output fixture mounted on the stand, and then to a frac pump connected to the system lubricant output fixture. Providing the system lubricant output fixture eliminates the need to connect directly to the pump element output when installed the packaged lubrication system in the field, simplifying installation for the field technician.

The lubricator systems described above can be sold with or without controls. When a lubrication system is sold without controls, the customer would provide the controls. The lubricator system would provide an electric connector on the lube pump to connect to the user's controls.

While the pumps being lubricated by the embodiments described above are referred to as frac pumps, the term is used herein to mean any high-pressure reciprocating pump and not just those used in hydraulic fracturing.

The embodiments described above include several novel features and not every embodiment will include all of the features described. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of providing lubricant for a frac pump, comprising:
   providing a reservoir having a first capacity:
   providing a pump assembly including:
      a multiple element pump, each element having an inlet and an outlet; and
      a manifold for receiving lubricant from the reservoir and supplying the lubricant to the multiple pump element inlets, the manifold having a second capacity;
   in which the ratio of the second capacity to the first capacity is between 0.01 and 0.2.

2. The method of claim 1 further comprising causing the pump assembly to operate, thereby causing the pump elements to draw in lubricant from the manifold and causing lubricant from the reservoir to flow into the manifold.

3. The method of claim 2 in which causing the pump assembly to operate causes the pump elements to output lubricant.

4. The method of claim 3 in which causing the pump to output lubricant comprises causing the pump to output lubricant to a system output, the system output connected to a lubricant point of the frac pump.

5. The method of claim 4 further comprising providing a stand that supports the reservoir and in which the system output is positioned on the stand.

6. The method of claim 1 further comprising providing a first filter for removing contaminants from the lubricant prior to the lubricant entering the reservoir.

7. The method of claim 6 further comprising providing a second filter for removing contaminants from the lubricant leaving the reservoir and entering the manifold.

8. The method of claim 1 further comprising providing a flow sensor connected to the outlet of each of the pump elements.

9. The method of claim 8 further in which the flow sensor connected to the outlet of each of the pump elements provides visual feedback.

10. The method of claim 8 further in which the flow sensor connected to the of each of the pump elements comprises a flow meter, a pressure gauge, or a pressure transducer.

11. The method of claim 1 further comprising providing a control system configured to receive signals from the flow sensors.

12. The method of claim 1 in which the reservoir has a capacity greater than 5 gallons and the manifold has a capacity of less than a gallon.

13. The method of claim 1 in which the reservoir has a capacity greater than 10 gallons and the manifold has a capacity of about 2 liters.

14. The method of claim 1 in which the pump assembly comprises a first pump assembly and the multiple element pump comprises three or five pump elements, and further comprising providing a second pump assembly, the second pump assembly comprising:

a second multiple element pump including three or five additional pump elements, each additional pump element having an inlet and an outlet; and a second manifold for receiving lubricant from the reservoir and supplying the lubricant to the inlets of the three or five additional pump elements, the manifold having a third capacity;

in which the ratio of the third capacity to the first capacity is between 0.01 and 0.2.

15. The method of claim 1 further comprising providing a low level sensor for determining when the lubricant level in the reservoir tank is low.

* * * * *